July 4, 1939.    E. E. PRANCE ET AL    2,164,675
TURPENTINE CUP
Filed Nov. 22, 1938
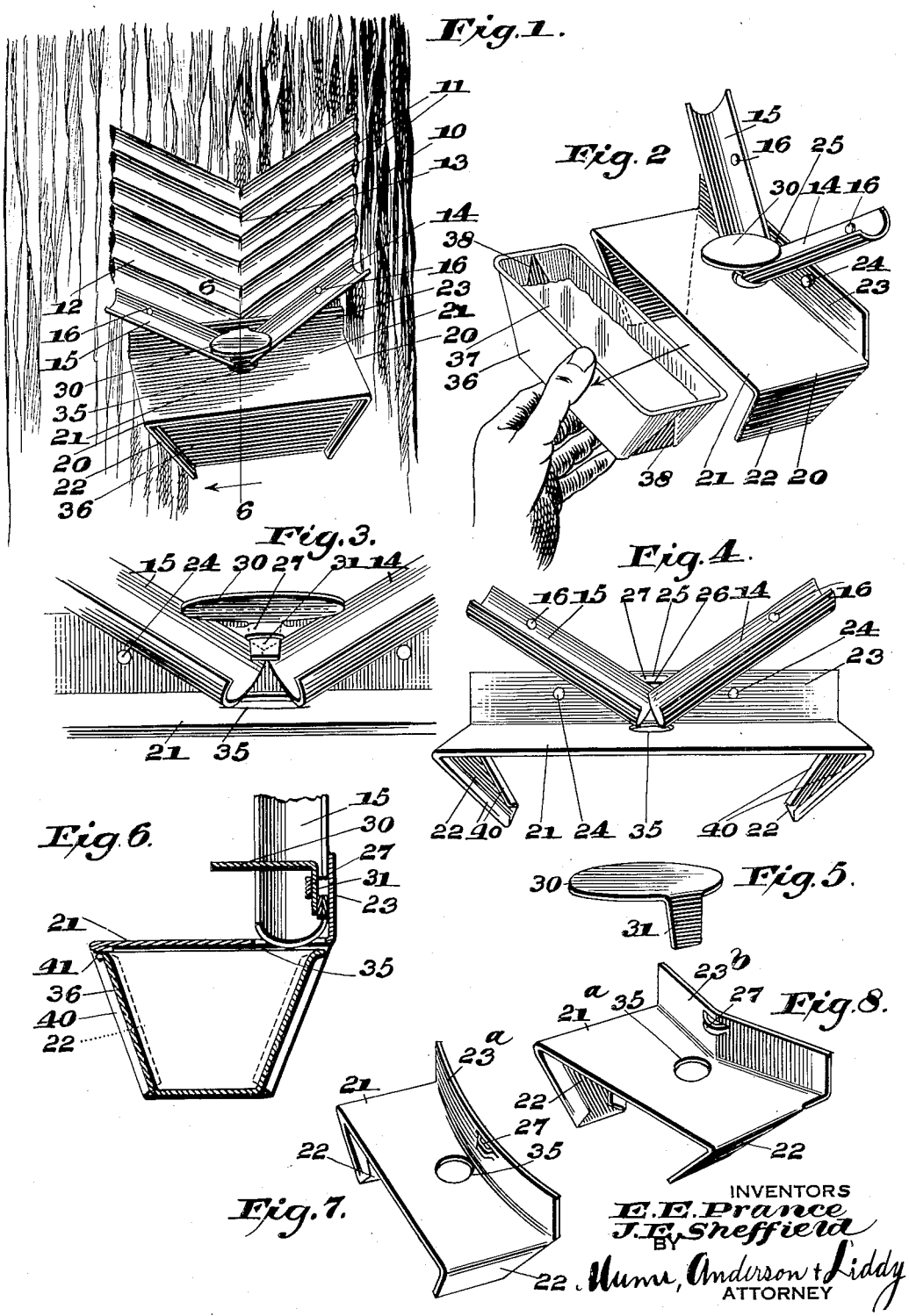
INVENTORS
E. E. Prance
J. E. Sheffield
BY Hume, Anderson & Liddy
ATTORNEY Patented July 4, 1939

2,164,675

UNITED STATES PATENT OFFICE 2,164,675

TURPENTINE CUP

Edgar E. Prance and John Elwin Sheffield, Quitman, Ga.

Application November 22, 1938, Serial No. 241,860

3 Claims. (Cl. 47—11)

This invention relates to turpentine cups. Various types of cups or containers have been proposed for attaching to a pine tree below a scarred portion to receive the gum which is directed by spouts or bent pieces of metal into the cup. Various means have been employed in an attempt to protect the cup from debris and water but so far they have been unsuccessful due to the fact that during rainy seasons the water will flow into the cup and thus the gum will be floated away from the cup as soon as it is deposited by the water in the cup. Furthermore, in the attempts to cover the receptacle while at the same time to prevent debris and water entering the cup too many restrictions have been placed in the path of the flowing gum that the openings become congested and the gum will flow over the top and beyond the sides of the container or cup.

It is an object of the present invention to provide a turpentine cup which may be inserted in position or which may be readily removed from a support connected with the tree trunk with the support acting as a cover to prevent water and debris entering the cup while at the same time preventing the loss of the gum from the cup by an overflow of water from the cup during rainy seasons.

Another object of the invention is the provision of a device which is adapted to be secured to a pine tree below the scores which will definitely direct the flowing gum into the cup while preventing debris from entering the cup but at no time will the passages leading to the cup become congested by the protective means for the cup.

A further object of the invention is the provision of a support and cover for a turpentine cup which will divert rain water from the cup while at the same time preventing twigs, bark, or other foreign matter from entering the cup or stopping the passage in the cover through which the gum is directed, the cover being preferably formed of any suitable metal, a shield being formed either integrally with the support or separately therefrom for directing foreign matter away from an opening in the cover through which the gum is directed.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Figure 1 is a view in perspective of a turpentine cup and shield shown applied to a pine tree, Figure 2 is a view in perspective of the shield and cup shown in detached relation, Figure 3 is a fragmentary view in perspective showing the gutters and protective shield in operative relation, Figure 4 is a view in perspective of the cover with the cup removed, Figure 5 is a view in perspective of a removable shield, Figure 6 is a vertical section taken along the line 6—6 of Figure 1, Figure 7 is a view in perspective of a slightly modified form of the cover, and Figure 8 is a view in perspective of a still further modified form of the cover.

Referring more particularly to the drawing, 10 designates a pine tree which is provided with the usual angularly disposed scores 11 and 12 in which the two pairs of scores meet in a line 13 so that the inner ends of the scores are inclined downwardly for directing the gum which exudes from the tree downwardly towards the center.

A pair of troughs 14 and 15 are secured usually by means of nails 16 to the trunk of a tree just at the lower edge of the lowermost score in order to receive and direct the gum to a definite point for depositing the same within a cup. The troughs 14 and 15 are formed of any kind of metal and may be transversely curved or they may be V-shaped in cross section or a straight piece of metal may be employed for the purpose which is secured directly to the tree trunk. The type of trough however employed is immaterial for the purposes of the present device.

A combined cover and support is generally indicated by the numeral 20 and this support includes a main body or plate 21 which has downwardly projected inturned flanges 22 extending from the opposite ends of the plate 21.

At the rear longitudinal edge of the plate 21 is an upstanding back plate 23 which is adapted to be secured to a tree trunk by any well known form of securing means such as nails or screws as indicated at 24. In this instance the back plate 23 is shown as being straight.

The back plate is provided with a pair of slits 25 and 26 to provide a strap 27 which is pressed outwardly to form a socket adjacent an opening 35 in the plate 21.

A shield 30 is shown as being in the shape of a round disc or this shield may assume any shape suitable for the purpose. A lip 31 projects downwardly from the shield and is received by the strap 27 whereby the shield is removably supported on the back plate 23. The plate 21 is provided with the opening 35 into which the inner free ends of the gutters 14 and 15 terminate in close association so that the gum which is directed downwardly by the troughs will be discharged into a removable container or cup 36. The opening 35 is directly beneath the shield 30 so that the opening and the inner free ends of the troughs will be protected from debris and the shield will also direct rain water away from the opening onto the plate 21, whence it will fall off the edges of the plate and away from the interior of the cup 36.

The cup is made of any suitable metal and has an open top 37 which is located in close association with the inner face of the plate 21. The side walls 38 of the cup are inclined at approximately the same angle as the inclination of the depending flanges 22 so that the cup may be moved inwardly beneath the plate 21 and be held in position by the frictional contact between the inner faces of the flanges 22 and the side walls 38 of the cup. The periphery of the opening 37 of the cup is in close association with the inner face of the plate 21 so that the gum which has entered the cup will not be forced outwardly from the cup by means of any water which accidently enters the cup. It will thus be seen that the cup is protected against loss of the gum after it has once entered the cup.

When the shield 30 is in position and the lip 31 has been forced downwardly and supported by the strap 27 it will be frictionally held in place and the shield itself will engage over the tops of the lower inner ends of the gutters 14 and 15 and prevent these gutters from being accidently displaced from the opening 35.

Where the flanges and plate 22 are made of relatively thin material the side edges of the flanges 22 as shown in Fig. 4 are turned inwardly to provide reinforcements 40 in order to stiffen the flanges so that they will properly support the cup 36. Where necessary, the front edge of the plate is turned under as shown at 41 (Fig. 6) and bent flat against the inner face to stiffen or reinforce the plate. Ordinarily however the plate is formed of sufficiently rigid material so that additional reinforcements are unnecessary.

Fig. 7 shows the back plate 23a as being curved so that it will neatly fit the curvature of the tree trunk and thus prevent the loss of gum between the trunk and the back plate where large trees are employed.

Referring more particularly to Fig. 8 it will be seen that the plate 21 has a V-shaped back plate 23b which is adapted to be secured to the tree in those cases where the scoring has taken such a shape that the trunk at this point is substantially V-shaped. It will be appreciated in this connection that the back plate may have a different configuration suitable for some particular purpose.

In the present construction the plate 21 forms not only a support for the cup 36 but also forms a cover to prevent debris from entering the cup and also prevent the loss of the gum from the cup thereby effecting a great saving in this art. The cup may be readily removed or replaced when desired or necessary without disturbing the support and without necessitating the tearing of the cup from its nailed position as is usual.

By eliminating nails from the lower ends of the gutters 14 and 15, time and labor are saved in installing or removing the gutters since the lower ends of these gutters are merely inserted below the lip or shield 30.

The inturned flanges may be crimped at the lower ends or they may be folded in the same manner as the ends of the cup for reinforcing and stiffening the flanges.

We claim:

1. A device of the character described comprising a base plate having an opening near one side edge, flanges depending from the ends of said plate and inclined inwardly towards each other, a back plate extending upwardly from the first-mentioned side edge of the plate and adapted to be secured to a tree trunk, an inclined gutter at each side of the opening, the inner free ends of the gutters projecting into the opening, a shield removably mounted on the back plate, covering the opening and operating to maintain the inner ends of the gutters in the opening, said base plate forming a covering for a turpentine cup slidably supported by the flanges.

2. A device of the character described comprising a base plate having an opening therein, a back plate extending upwardly from one side edge and adapted to be secured to a tree trunk, means on the plate adapted to slidably receive a turpentine cup for supporting the cup beneath the plate, gutters having the inner ends thereof extending into the opening, a shield carried by the back plate and supported in protective relation with the opening, said shield retaining the inner ends of the gutters in the opening.

3. A device of the character described comprising a flat plate having an opening intermediate the ends thereof, a flange extending upwardly along one edge of the plate and adapted to be secured to the trunk of a tree, inturned flanges projecting downwardly from the opposite ends of the plate, a cup having inclined end walls frictionally received by the inturned flanges whereby said cup is supported by the inturned flanges, the upper edge of said cup being located in close association with the underface of the plate, an inclined gutter secured to the tree and having the lower end projecting into the opening, and a shield located over the opening.

EDGAR E. PRANCE.
JOHN ELWIN SHEFFIELD.